2,842,475
Patented July 8, 1958

2,842,475

OXYALKOXYCARBONYL DITHIOCARBAMATES

W E Craig and Chien-Pen Lo, Philadelphia, Pa., assignors to Rohm & Haas Company, Philadelphia, Pa., a corporation of Delaware No Drawing. Application March 1, 1956
Serial No. 568,720

12 Claims. (Cl. 167—22)

This invention deals with oxyalkoxycarbonyl derivatives of dithiocarbamic acids, this is, derivatives of these acids in which there is a —COOC$_n$H$_{2n}$O— grouping attached to a sulfur atom at the carbon atom thereof with the indicated valence. These derivatives may take several forms which fall into related classes. In the first class (I) may be placed compounds having a —COOC$_n$H$_{2n}$O— group as a substituent attached at the indicated carbon atom to a sulfur atom of a dithiocarbamate group, —S(S)CN=. Of these, there are two sub-classes, (a) 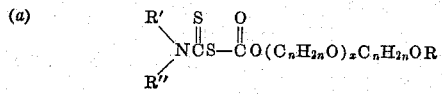

and (b) 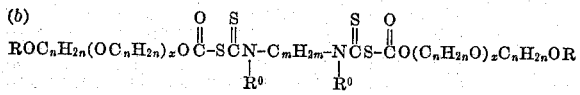

In the second class (II) may be placed compounds having a —COOC$_n$H$_{2n}$O— grouping occurring between two dialkyl dithiocarbamate groups or equivalent, these compounds being of the formula (a) 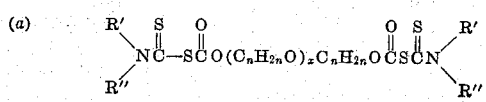

wherein if $x$ has a value of zero, there occurs the special case (a′) 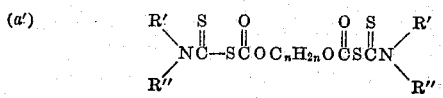

If the oxycarbonyl derivative is that of an alkylene bisdithiocarbamic acid, there results a substance having the essential structure (b) 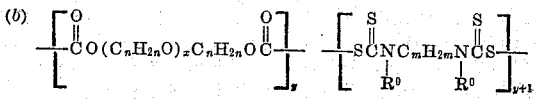

a material which might be considered polymeric in nature, since it has repeating units. The terminal groups tend apparently to be salt groups, hence the indicated $y+1$ subscript. The terminal salt group may be substituted with a metal other than that of the starting soluble salt, such as zinc, iron, or manganese.

In the above formulas R is a hydrocarbon radical usually of not over eight carbon atoms, preferably an alkyl group of not over four carbon atoms, although it may also be phenyl, methyl-phenyl, benzyl, methylbenzyl, cyclohexyl, alkenyl, best of at least three carbon atoms such as allyl or crotyl, or a similar group having as a substituent a halogen, a nitro group, an ether group, or the like, although secondary differences in reactivity and utility may be thus developed. R′ and R″ represent alkyl groups of not over four carbon atoms each (not necessarily the same) when taken individually or, when taken together, saturated divalent aliphatic groups of four to five atoms which with the nitrogen form a five- to six-sided heterocycle which has one ring as in the morpholino, thiomorpholino, pyrrolidinyl, or piperidino groups, R° is usually and preferably hydrogen but may be a small alkyl group, such as methyl. The subscripts $m$, $n$, $x$, and $y$ are numbers, $m$ having a value of two to three, $n$ having a value of two to four, $x$ having a value from zero to two, and $y$ having a value of one or more, with values from one to about five. In the above formulas C$_m$H$_{2m}$ is an alkylene group of two to three carbon atoms and C$_n$H$_{2n}$ is an alkylene group of two to four carbon atoms, there being at least two carbon atoms in each chain between heteroatoms in order to have these divalent groups classified as alkylene.

This invention also concerns methods of preparation of the above compounds and their use as fungicidal agents for protecting plants against pathogenic organisms.

Some alkoxycarbonyl dimethyldithiocabamates have been prepared, but, with a few outstanding exceptions, they have proved rather unstable. In contrast to such known compounds, the compounds of this invention are surprisingly stable and, therefore, useful and applicable under a great variety of conditions.

The above described compounds are prepared by reacting a haloformate of an ether alcohol or a glycol and a soluble salt of a dithiocarbamic acid. The reaction is most conveniently carried out in the presence of an inert solvent such as water, acetone, dimethylformamide, ethers including dioxane, benzene, or toluene. The reaction is desirably performed at a temperature between −10° and about 30° C., preferably between 0° and 25° C.

Typical dithiocarbamate salts which can be used are sodium, potassium, magnesium, or other soluble metal salts of dimethyldithiocarbamic acid, diethyldithiocarbamic acid, dipropyldithiocarbamic acid, dibutyldithiocarbamic acid, methylbutyldithiocarbamic acid, ethylene bisdithiocarbamic acid, propylene bisdithiocarbamic acid, or trimethylene bisdithiocarbamic acid, or 3-oxapentylenyldithiocarbamic acid (i. e. the dithiocarbamate from morpholine and carbon disulfide), tetramethylenyldithiocarbamic acid (based on pyrrolidine and carbon disulfide), pentamethylenyldithiocarbamic acid, and similar dithiocarbamic acids having a ring substituent such as methyl.

Typical of the haloformates which can be used are methoxyethyl, ethoxyethyl, butoxyethyl, amyloxyethyl, octoxyethyl, ethoxypropyl, butoxypropyl, ethoxyethoxyethyl, butoxyethoxyethyl, ethoxypropoxyethyl, methoxypropoxyethyl, ethoxyethoxyethoxyethyl, ethoxypropoxypropyl, phenoxyethyl, cresoxyethyl, benzyloxyethyl, cyclohexoxyethyl, methoxybutyl, ethoxybutyl, phenoxybutyl, methylphenoxyethyl, or methylbenzoxyethyl chloroformates or bromoformates or the esters of ethylene glycol, diethylene glycol, triethylene glycol, propylene glycol, butylene glycol, dipropylene glycol, hydroxyethoxypropoxyethanol, and similar glycols and chloro- or bromoformic acids.

These reactants are usually brought together in about equivalent proportions, although an excess, for example at 10 to 25% excess, may also be used. The mixture of reactants is desirably stirred for one-half to five or more hours. After the haloformate and salt of a dithiocarbamic acid have been mixed and reacted, the metal halide formed is washed out while the organic compound formed is separated. It may be purified by conventional methods, if desired, as by extracting, recrystallizing, or

Example 1 n-Butoxyethyl chloroformate (54.2 parts) is slowly added to a solution of sodium dimethyldithiocarbamate (50.7 parts) in dimethylformamide (100 parts) with stirring and cooling, the temperature being kept below 10° C. The mixture is stirred for one hour and water (500 parts) is added. An oil forms and is separated, washed with water, and dried over calcium sulfate. There is obtained 58.5 parts or orange oil. This material is n-butoxyethoxycarbonyl dimethyldithiocarbamate.

Analysis.—Calcd. for $C_{10}H_{19}NO_3S_2$: N, 5.3%; S, 24.2%. Found: N, 5.7%; S, 22.9%.

In standard fungitoxicity tests this compound was found to have an $LD_{50}$ value of 5–10 p. p. m. against *Stemphylium sarcinaeforme*.

Repetition of the above procedure with use of 56 parts of potassium dimethyldithiocarbamate in the place of the above sodium salt leads to the identical product.

Repetition of the above procedure with substitution of 60 parts of sodium diethyldithiocarbamate for the above sodium salt leads to n-butoxyethoxycarbonyl diethyldithiocarbamate which resembles closely the above homologue in its properties.

In the same way 60 parts of phenoxyethyl chloroformate is mixed with 51 parts of sodium dimethyldithiocarbamate in 100 parts of dimethylformamide with stirring and cooling to maintain the temperature of the mixture below 15° C. When mixing is complete, the mixture is stirred for two hours with the temperature of the mixture rising to about 25° C. The reaction mixture is treated with about 500 parts of water. Layers form and are separated. The organic layer is washed several times with water and dried over calcium sulfate. There is obtained 64 parts of phenoxyethoxycarbonyl dimethyldithiocarbamate in the form of a viscous oil, as obtained, for which the nitrogen content appears 5.3% and sulfur content is 22.0% (theory 4.9% and 22.5% respectively). This compound has about the same fungitoxicity as the above compounds and is held tanaceously on washed surfaces.

In the same way other oxyalkoxycarbonyl groups bearing ring substituents can be used. Thus the benzyloxyethoxycarbonyl dimethyldithiocarbamate and cyclohexoxyethoxycarbonyl dimethyldithiocarbamate are likewise prepared and are highly active against fungi.

By the same procedure allyloxyethyl chloroformate is used in place of the above chloroformates. The product is likewise obtained as an oil which corresponds in composition to allyloxyethoxycarbonyl dimethyldithiocarbamate. It, too, is highly fungitoxic to the standard test organisms.

Example 2 n-Butoxyethyl chloroformate (54.2 parts) is slowly added to a 22.5% aqueous solution of sodium ethylenebisdithiocarbamate (194 parts) with stirring and cooling to maintain the temperature below 15° C. The mixture is stirred for three hours. The solid which separates is collected, washed with water, and dried in the air. There is obtained 67 parts of a yellow solid which melts at 57°–58° C. This solid is bis n-butoxyethoxycarbonyl ethylenebisdithiocarbamate.

Analysis.—Calcd. for $C_{18}H_{32}N_2O_6S_4$: N, 5.6%; S, 25.6%. Found: N, 6.2%; S, 24.0%. This compound exhibited marked inhibition of germination of spores of standard test fungi.

Example 3

Ethoxyethoxypropylchloroformate (44.7 parts) is slowly added to a solution of sodium dimethyldithiocarbamate (43 parts) in dimethylformamide (150 parts) with stirring and cooling to hold the temperature of the reacting mixture below about 10° C. The mixture is stirred for two hours. The oil which formed is separated, washed with water, and dried over calcium sulfate. There is obtained 25.1 parts of a brown oil which is ethoxyethoxypropoxycarbonyl dimethyldithiocarbamate.

Analysis.—Calcd. for $C_{11}H_{21}NO_4S_2$: N, 4.7%; S, 21.6%. Found: N, 4.9%; S, 20.1%.

In standard tests for phytotoxicity this compound had an $LD_{50}$ value of less than one p. p. m. against *Stemphylium sarcinaeforme*. In the tenacity test it gave complete inhibition of the above organism when applied at 1 lb./100 gal. even after 32 minutes of washing.

Example 4

Diethyleneglycol chloroformate (120.5 parts) is slowly added to a solution of sodium dimethyldithiocarbamate (150 parts) in dimethylformamide (300 parts) with stirring and cooling, the temperature being kept below 20° C. The mixture is stirred for one hour and poured into water. The solid which separates is collected, washed with water, and dried in the air. There is obtained 170 parts of a yellow solid which melts at 117°–118° C. and corresponds in composition to 3-oxapentylene-1,5-di-(oxycarbonyl dimethyldithiocarbamate).

Analysis.—Calcd. for $C_{12}H_{20}N_2O_5S_4$: N, 7.0; S, 32.0%. Found: N, 7.3; S, 28.4%.

In standard phytotoxicity tests this compound had an $LD_{50}$ value of 5–10 p. p. m. against *Stemphylium sarcinaeforme* (S. s.). It showed no toxic effect on tomato plants even at 1%. It had ultra-violet light stability when tested against both *Stemphylium sarcinaeforme* and *Monilinia fructicola* (M. f.) Its fungitoxicity against *Monilinia fructicola* increased when exposed to ultra-violet light, an unusual and advantageous property.

In the same way there are reacted 120 parts of sodium dibutyldithiocarbamate and 60 parts of diethyleneglycol chloroformate. The product separates as a yellow oil, which corresponds in composition to 3-oxapentylene-1,5-di(oxycarbonyl dibutyldithiocarbamate). This product is fungicidally active against the standard test organisms at dilutions of about 50 p. p. m.

Example 5

Diethyleneglycol chloroformate (56.8 g.) is slowly added to a mixture of sodium diisopropyldithiocarbamate (113.5 parts), acetone (150 parts), and water (200 parts) with stirring and cooling to maintain the temperature below about 8° C. The mixture is stirred for two hours and then poured into water (1000 parts). The solid which separates is collected, washed with water, and dried in the air. There is obtained 107 parts of a yellow solid which after recrystallization from ethanol, melts at 80°–82° C. and corresponds in composition to 3-oxapentylene-1,5-di-(oxycarbonyl diisopropyldithiocarbamate).

Analysis.—Calcd. for $C_{20}H_{36}N_2O_5S_4$: N, 5.5%; S, 25.0%. Found: N, 5.3%; S, 24.3%.

This compound has a fungitoxicity requiring less than 50 p. p. m. for the $LD_{50}$ value.

Example 6

Ethylene dichloroformate (24 parts) is slowly added to a solution of sodium dimethyldithiocarbamate (43 parts) in dimethylformamide (135 parts) with stirring and cooling to maintain the temperature below 20° C. The mixture is stirred for two hours and water (500 parts) is added. The solid which separates is collected, washed with water, and dried in the air. There is obtained 40 parts of a yellow solid which melts at 68°–71° C. and corresponds in composition to ethylenedi-(oxycarbonyl dimethyldithiocarbamate). It inhibits germination of spores of *Stemphylium sarcinaeforme* with an $LD_{50}$ value of less than 10 p. p. m. It shows no phytotoxicity when applied at 1% to tomato plants.

Example 7

Ethylene dichloroformate (56 parts) is reacted with sodium 4-morpholinecarbodithioate (120 parts) in dimethylformamide (200 parts) as above. There is obtained 132 parts of a yellow solid which melts at 87°–88° C. which corresponds in composition to ethylenedi-(oxycarbonyl-4-morpholinecarbodithioate) and is powerfully fungitoxic.

Example 8

1,4-butylene dichloroformate (43 parts) is slowly added to a solution of sodium dimethyldithiocarbamate (64.5 parts) in dimethylformamide (200 parts) with stirring and cooling, the temperature being kept below 10° C. The mixture is stirred for one hour and water (1000 parts) is added. The solid which separates is collected, washed with water, and dried in air. There is obtained 70 parts of a yellow solid which is 1,4-butylenedi-(oxycarbonyl dimethyldithiocarbamate). This compound is also very active fungicidally.

*Analysis.*—Calcd. for $C_{12}H_{20}N_2O_4S_4$: N, 7.3; S, 33.4%. Found: N, 7.4%; S, 31.6%.

Example 9

1,4-butylene dichloroformate (43 parts) is reacted with sodium 1-piperidinecarbodithioate (91.5 parts) in dimethylformamide (200 parts) as above. The 1,4-butylenedi-(oxycarbonyl-1-piperidine-carbodithioate) is obtained as a yellow solid which melts at 112°–113° C. and corresponds in composition to 1,4-butylenedi-(oxycarbonyl-1-piperidinecarbodithioate). It is likewise a powerful fungicide.

Example 10

To 342 parts of an aqueous disodium ethylenebisdithiocarbamate solution there is slowly added an aqueous solution of 69.3 parts of the chloroformate of diethylene glycol in 240 parts of ethanol. The mixture is stirred and kept below 10° C. by external cooling. The reaction mixture is allowed to warm up and stirred at 25° to 30° C. for about an hour. A gummy white solid forms. The mixture is decanted and the resinous prouct washed with water. There is obtained 95 parts of the resinous condensate.

It is soluble in acetone and can be used from such solutions in aqueous sprays upon extension with water. Also, the acetone solution can be applied to a finely divided inert solid carrier and used in dusts or wettable powders. The product is fungicidally active in any of the usual forms of products.

In this product there are units derived from the ethylene bisdithiocarbamate and from diethylene glycol. The product can be defined by Formula IIb, where $m$ has a value of two, $C_mH_{2m}$ being an alkaylene group of two carbon atoms, R° is hydrogen, $n$ has a value of two, $C_nH_{2n}$ being an ethylene group, $x$ has a value of one, and $y$ has a value of about two.

As might be expected, there is variation from preparation in the value of $y$. It should also be remarked that there are considerable differences in the stability of different preparations of the resinous materials.

The oxyalkoxycarbonyl dithiocarbamates are useful for protecting plants against diseases caused by fungi. For this purpose one or more of these compounds is applied to plants or their environment in a spray or dust. The spray or dust may be applied directly to any plant organ, such as seed, stem, leaf, or fruit or indirectly to the underground parts of the plant by treating the soil about the seed, as when planting is being done. Compounds of this invention are very effective for controlling common pathogens which are soil-borne.

In applying a compound of this invention it may be extended with one or more finely divided inert solids, such as clay, diatomaceous earth, talc, pyrrophilite, or the like. The compound may be mechanically mixed with the solid extender or it may be taken up in a volatile organic solvent and the compound thus spread on finely divided solid parties. The solvent may then be driven off. Dispersing and/or sticking agents may be incorporated in the mixture. Concentrations of 1% to 10% are generally used in the preparation of dusts.

A typical dust can be made from five parts of one of the above compounds, one part of condensed naphthalene sodium sulfonate dispersant, 84 parts of kaolin, and 10 parts of diatomaceous earth.

A similar composition in which a higher percentage of one of the above described compounds is used along with a wetting agent, such as an alkylphenoxypolyethoxyethanol or a higher alcohol sulfate or an alkylbenzesulfonate can be used as a wettagle powder, which can be extended with water and applied in a spray. A typical formulation is 25 parts of one of the compounds of this invention, 70 parts of a finely particled Georgia clay, two parts of a lignin sulfonate, and three parts of an octylphenoxylpolyethoxyethanol wetting agent.

Emulsion concentrates may be prepared by dissolving one or more of the compounds of this invention in an organic solvent for the particular compound selected, such as an aromatic naphtha, xylene, toluene, pine oil, butoxyethanol, butoxyethoxyethanol, acetone or other relatively inert solvent or mixture of solvents. While an emulsifying agent may be separately mixed with the solution and water, it is convenient to add to the solution an emulsifying agent or agents soluble therein. The ethylene oxide reaction products with alkylphenols, long chained mercaptans, higher alcohols, larger carboxylic acids, and the like are particularly useful for this purpose, although other wetting agents including sulfates, sulfonates, and quaternary ammonium compounds can also be used, particularly in conjunction with a non-ionic agent.

A typical formulation calls for 20 parts of one or more of the oxyalkoxycarbonyl dithiocarbamates, five parts of an alkylphenoxypolyethoxyethanol, and 75 parts of xylene. In place of the five parts of alkylphenoxypolyethoxyethanol, there may be used two parts of this compound and three parts of calcium dodecylbenzenesulfonate.

An emulsifiable concentrate is diluted with water to give a dispersion of active compound which is sprayed onto plants or into soil or onto fruits. Usual dilutions provide one-half to two pounds of active agent per 100 gallons of water.

The compounds of this invention are highly promising for application to protect against such plant diseases as early and late blight of tomatoes and potatoes, rusts of rye, wheat, and beans, soil-borne diseases, diseases of cucurbits, onions, lettuce, and beets, including downy mildew, Cercospora leaf spot, Alternaria leaf blight, blotch, blast, etc., fungus diseases of ornamentals such as petal blight of azaleas and camellias, rust of carnations and snapdragons, blackspot on roses, Stemphylium and botrytis on gladioli, and many typical diseases of fruits.

Tests of typical compounds of this invention applied at 0.1% and 1% on typical plants showed no phytotoxicity.

An oxyalkoxycarbonyl dithiocarbamate may be used as the sole fungicidal agent or it may be used in conjunction with other fungicidal agents or with one or more insecticides, such as bis(chlorophenyl)dichloroethane, bis(chlorophenyl)trichloroethane, bis(ethylphenyl)dichloroethanol, parathion, malathion, or other neutral or acidic insecticide, or with a miticide such as bis(chlorophenyl)-trichloroethanol or dinitrocaprylphenyl crotonate, which is also an effective fungicide.

We claim:

1. A compound from the class consisting of compounds of the structures

Ia 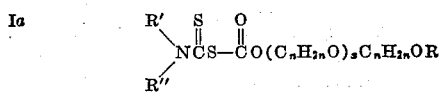

Ib 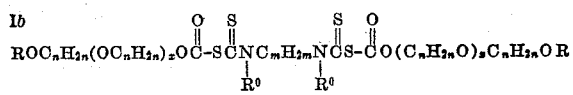

IIa 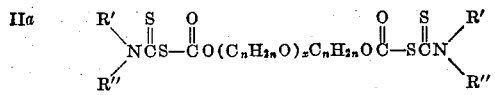

IIb 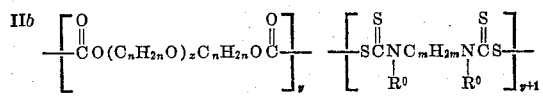

wherein R is hydrocarbon radical from the class consisting of alkyl groups of not over four carbon atoms and phenyl, benzyl, cyclohexyl, and allyl groups, R′ and R″ when taken individually are alkyl groups of not over four carbon atoms each and when taken together form a saturated divalent aliphatic chain of four to five carbon atoms which with the nitrogen atom forms a five- to six-sided heterocycle which has one ring and with an N-hydrogen becomes a secondary monoamine, R° represents a member of the class consisting of hydrogen and the methyl group, and $m$, $n$, $x$, and $y$ are numbers, $m$ having a value of two to three, $n$ having a value of two to four, $x$ having a value from zero to two, and $y$ having a value from one to five.

2. The compound of the Formula Ia in which R′ and R″ are methyl groups, $n$ has a value of two, $x$ has a value of zero, and R is a butyl group.

3. The compound of the Formula Ib wherein R is the butyl group, R° is hydrogen, $n$ and $m$ have values of two, and $x$ is zero.

4. The compound of the Formula IIa in which R′ and R″ are methyl groups, $x$ has a value of one, and $n$ has a value of two.

5. The compound of the Formula IIa in which R′ and R″ are methyl groups, $n$ has a value of two, and $x$ has a value of zero.

6. A compound of the Formula IIb in which $n$ has a value of two, $x$ has a value of one, $m$ has a value of two, R° is hydrogen, and $y$ has a value of about two.

7. The process of controlling fungi which attack plants which comprises supplying to the environment of the plant a compound from the class consisting of compounds of the structures Ia 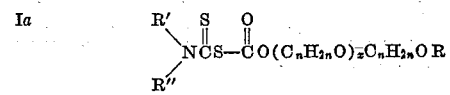

Ib 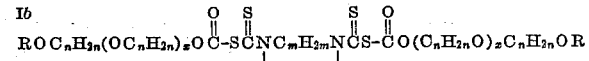

IIa 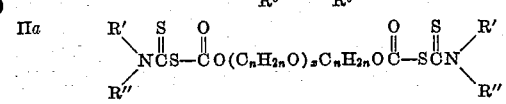

and

IIb 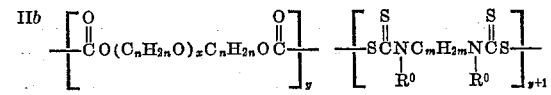

wherein R is hydrocarbon radical from the class consisting of alkyl groups of not over four carbon atoms and phenyl, benzyl, cyclohexyl, and allyl, groups R′ and R″ when taken individually are alkyl groups of not over four carbon atoms each and when taken together form a saturated divalent aliphatic chain of four to five carbon atoms which with the nitrogen atom forms a five- to six-sided heterocycle which has one ring and with an N-hydrogen becomes a secondary monoamine, R° represents a member of the class consisting of hydrogen and the methyl group, and $m$, $n$, $x$, and $y$ are numbers, $m$ having a value of two to three, $n$ having a value of two to four, $x$ having a value from zero to two, and $y$ having a value from one to five.

8. The process of controlling fungi which attack plants which comprises supplying to the environment of the plant a compound of the Formula Ia in which R′ and R″ are methyl groups, $n$ has a value of two, $x$ has a value of zero, and R is a butyl group.

9. The process of controlling fungi which attack plants which comprises supplying to the enviromnent of the plant a compound of the Formula Ib wherein R is the butyl group, R° is hydrogen, $n$ and $m$ have values of two, and $x$ is zero.

10. The process of controlling fungi which attack plants which comprises supplying to the environment of the plant a compound of the Formula IIa in which R′ and R″ are methyl groups, $x$ has a value of one, and $n$ has a value of two.

11. The process of controlling fungi which attack plants which comprises supplying to the environment of the plant a compound of the Formula IIa in which R′ and R″ are methyl groups, $n$ has a value of two, and $x$ has a value of zero.

12. The process of controlling fungi which attack plants which comprises supplying to the environment of the plant a compound of the Formula IIb in which $n$ has a value of two, $x$ has a value of one, $m$ has a value of two, R° is hydrogen, and $y$ has a value of about two.

No references cited.